March 1, 1932. A. H. LAUDER 1,847,881
BRAKE MECHANISM
Filed March 30, 1928
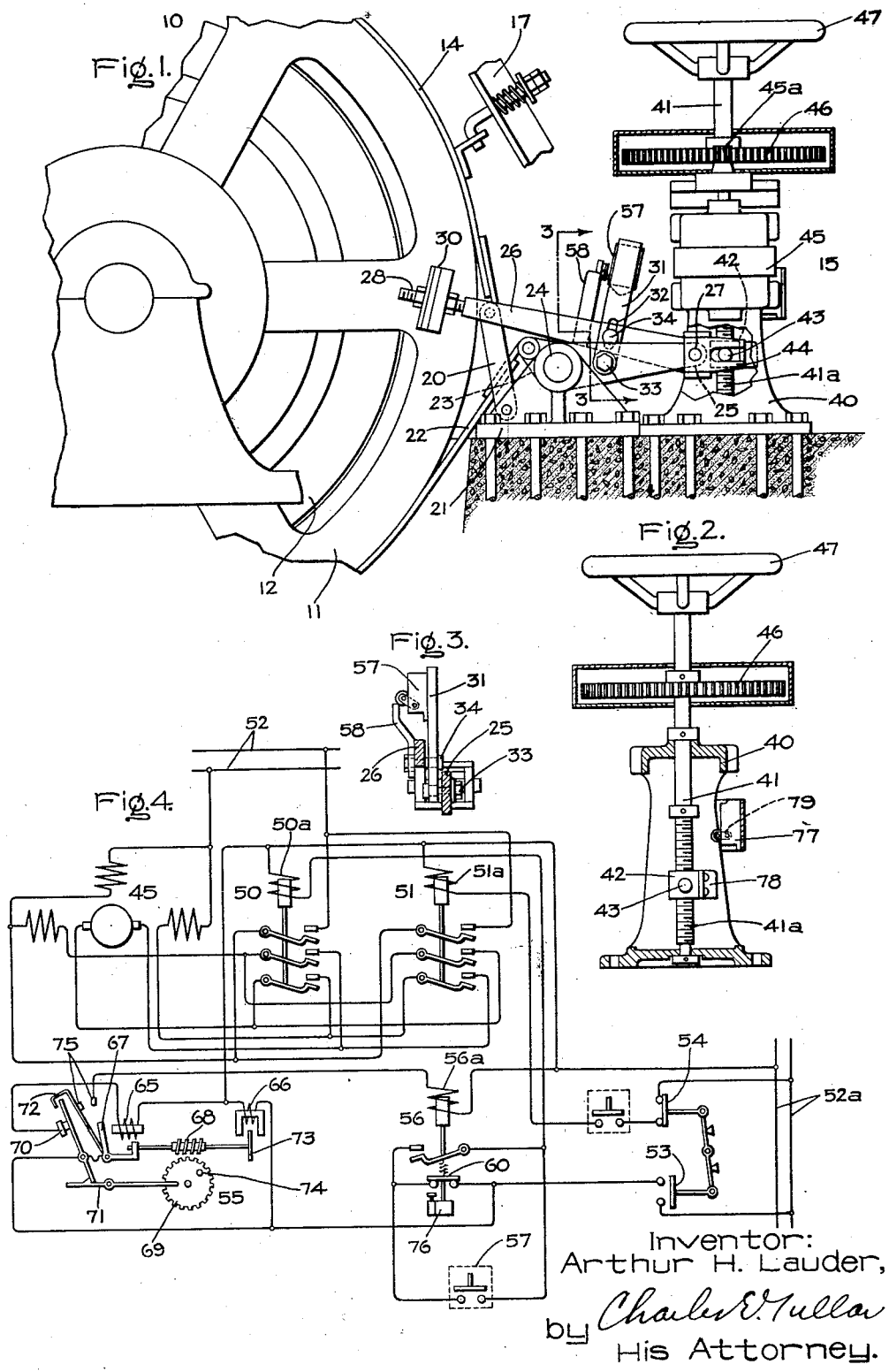
Inventor:
Arthur H. Lauder,
by Charles E. Tullar
His Attorney.

Patented Mar. 1, 1932

1,847,881

UNITED STATES PATENT OFFICE

ARTHUR H. LAUDER, OF SCHENECTADY, NEW YORK, ASSIGNOR TO GENERAL ELECTRIC COMPANY, A CORPORATION OF NEW YORK

BRAKE MECHANISM

Application filed March 30, 1928. Serial No. 266,054.

My invention relates to brake mechanisms, more particularly to brake mechanisms such as employed in bringing heavy rotating bodies to rest, and has for its object the provision of simple and reliable means for applying a predetermined braking force.

Although it obviously has other applications my invention is particularly useful in the braking of the stator members of synchronous motors.

Synchronous motors are able to develop but a very small starting torque and therefore it is impractical to start the motor with the load connected thereto where a large starting torque is required, as, for example, in driving a considerable amount of shafting. In one arrangement for starting such a motor under load, the motor is provided with a stator member which is capable of being rotated, and during the starting operation this stator is first brought up to synchronous speed with the rotor and its connected load stationary. After the stator has been brought up to synchronous speed, a brake is applied to the stator and it is brought to rest, the rotor being thereby brought up to synchronous speed.

It is desirable to bring the stator to rest fairly rapidly, but not so rapidly as to cause the brake to seize or to cause an excessive inrush of current to the motor or to cause the imposition of a heavy strain upon the brake mechanism. It is further desirable to increase the braking force upon the stator after it has been brought to rest in order to prevent any possibility of the stator slipping under sudden changes of load. In one of its aspects my invention has for its object a simple and reliable braking mechanism, one effecting a smooth, gradual and uniform application of the braking force to the synchronous motor stator and one effecting positive locking means for the stator after it has been brought to rest.

In carrying out my invention in one form, I provide a friction braking member for the motor stator, the braking member being urged into frictional engagement with the motor stator during the braking operation by a predetermined force acting through a lever mechanism. After the stator has been brought to rest by the action of the predetermined force, an additional force is transmitted through the lever mechanism to the braking member for locking the stator member securely.

For a more complete understanding of my invention reference should be had to the accompanying drawings in which:

Figure 1 is an elevation of a synchronous motor provided with a brake embodying my invention; Figure 2 is a vertical section taken through the upright standard, showing the vertical shaft and trunnion block; Figure 3 is a vertical section of the leverage mechanism taken through the line 3—3 of Figure 1; and Figure 4 is a simplified diagram showing a system of control for the brake motor.

Referring to the drawings, I have shown my invention in one form as applied to a synchronous motor having both its armature and field mounted for rotation. As shown, the synchronous motor 10 is provided with a rotatable stator 11 constituting an armature and a rotatable field member 12 to which the load is connected. It will be understood that in the starting operation, the synchronous motor 10 is operated in any suitable manner, for example, as an induction motor, the armature being first brought up to synchronous speed and then braked in order that the field 12 to which the load is attached may be brought up to synchronous speed. Suitable braking mechanism is provided for bringing the rotatable stator 11 to rest after it has first been brought up to synchronous speed.

The brake mechanism comprises a suitable brake band 14, actuating means 15 and a lever mechanism through which the actuating means controls the braking motion of the band. As shown, the band 14 entirely surrounds the outer periphery of the stator 11 and is held in proper position with relation to the stator by means of a band support 17. One end 20 of the band 14 is secured to the foundation 21 and the other end 22, that is the slack end of the band, is secured to the lever mechanism so that the band may be applied to or released from the stator 11 as desired by the actuating means 15.

As shown, the slack end of the brake band is secured to one end of an arm 23, the arm 23 in turn being keyed to a shaft 24 supported from the foundation 21. An arm 25 is also keyed to the shaft 24, and to the free end of the arm 25 a lever 26 is pivoted by means of a pin 27 about which the lever 26 may rotate. The lever 26 is provided at one end with a screw thread 28 upon which a plurality of weights 30 are threaded, the threaded connection between the lever and weights permitting ready adjustment of the position of the weights upon the lever. A link 31 provided with a slot 32 is pivoted by a pin 33 to the arm 25 at a point intermediate the shaft 24 and the pivot pin 27. The weighted lever 26 carries a pin 34 which projects through and works in the slot 32 thus permitting a limited rotative movement of the lever 26 about its pivot 27, the pin 34 normally resting in the lower portion of the slot which serves as a lower limit for the lever 26.

It will be clear by reference to Figure 1 that a force applied to the unweighted end of the lever 26 in a downward direction will first move the arm 25 and thus the arm 23 in a clockwise direction about the pivot 24 whereby the slack in the brake band 14 is absorbed. During this initial movement of the arms 23 and 25, the pin 34 rests in the bottom of the slot 32, the entire lever mechanism moving about 24 as a pivot. As soon, however, as the band tension has increased sufficiently to balance the weights 30, the lever 26 begins to rotate about its pivot pin 27 and the pin 34 travels upwardly within the slot 32, thus permitting the entire force of the weight multiplied through the lever mechanism to be applied to brake the stator 11. It will be understood that the arms 23 and 25 constitute in effect a single lever of the first class fulcrumed about 24 as a center, and that this lever of the first class, together with the lever 26 constitutes a compound lever mechanism through which the braking force of the weights 30 is applied to the brake band 14.

It will be further observed that continued upward movement of the lever 26 does not increase the braking force upon the stator 11. Thus, as long as the pin 34 moves freely upward within the slot 32 the entire braking force applied to the stator 11 is the force of the weights 30 multiplied through the compound lever mechanism.

The actuating means 15 provided for causing the lever mechanism to either apply or release the brake band 14 is constructed so that the brake may be either applied manually or by means of a motor. Referring to Figs. 1 and 2 it will be observed that the mechanism 15 comprises an upright standard 40 which supports a vertical shaft 41. The lower end of the shaft 41 is provided with a screw thread 41a.

In order that the vertical shaft 41 may by rotating movement transmit motion to the lever mechanism, it is provided with a trunnion block 42 threaded upon it, the block 42 being formed with projecting pins 43 that are engaged by a fork 44 carried by the end of the lever 26. Thus, upon rotation of the vertical shaft the trunnion block is either raised or lowered depending upon the direction of rotation of the shaft, and the forked end of the lever 26 is moved up or down with it. The standard 40 also serves as a support for the operating motor 45 shown as an electric motor, which is mechanically connected to the vertical shaft 41 by means of a spur gear 46, mounted upon the shaft and a pinion 45a mounted upon the motor shaft. A hand-wheel 47 is mounted upon the upper end of the shaft 41 so that in case of emergency the brake may be manually operated.

In the operation of the braking mechanism, the shaft 41 is rotated in a direction to lower the trunnion block 42 until the weights 30 are balanced by the tension applied to the band 14. This action applies a braking force to the stator that gradually increases in magnitude until the weights 30 are balanced, whereupon the braking force becomes constant, its value depending upon the mass of the weights and the leverage between the weights and the slack end 22 of the band. Preferably the braking force is of such value that the stator may be brought to rest rapidly, but not so rapidly as to cause the brake to seize or to cause an excessive inrush of current to the synchronous motor 10. When the entire inertia of the stator 11 has been absorbed and the stator brought to rest, the shaft 41 is again rotated to move the trunnion block 42 still lower upon the shaft, this movement of the block 42 causing the pin 34 carried by the lever 26 to rise within the slot 32 until it engages the upper end thereof. The engagement of the pin 34 with the top of the slot 32 checks the pivoting of the lever 26 about its pivot 27, and the lever 26 together with the arms 23 and 25 rotate about 24 as a center applying still further tension upon the band 14, thereby securely locking the motor frame and preventing possible slippage due to shocks produced by the load. It will be observed that the arms 23 and 25 and the lever 26 constitute in effect a lever of the first class pivoted at 24 during this final braking operation, the screw 41a acting through the block 42 and the first class lever mechanism directly applying the tensioning force to the band.

Suitable control means are provided for the motor 45 so that the motor may be caused to automatically apply the braking force to the stator 11 in accordance with the above described cycle of operation. A simplified diagram of the control means for the motor is shown in Fig. 4. The motor 45 is shown as being of a direct current type. It is provided with a forward contactor 50, a reversing contactor 51, a suitable source of direct current electrical supply 52, and a pair of push buttons 53 and 54 for controlling the direction of movement of the motor. The desired sequence of operation of the forward contactor 50 is obtained by means of the definite time relay 55, the control relay 56 and the limit switch 57. The limit switch 57 is mounted upon the link 31 and is thrown by the arm 58 carried by the lever 26 when the latter moves the pin 34 to a point approximately midway of the slot 32.

The operation of the braking mechanism as actuated by the automatically controlled motor 45 is as follows: In order to start the motor 45 the start push button 53 is closed and a circuit completed from a source of alternating current 52a through the push button 53, the interlock contacts 60 of the control relay 56, the limit switch 57 and the operating coil 50a of the forward contactor 50. The contactor 50 is thereby closed and the motor 45 thereupon operates in a forward direction, i. e., in a direction to cause the trunnion block 42 to travel downward on the screw 41a and the brake to be tightened until upon the balancing of the weights 30, as previously described, the lever 26 rotates about its pivot 27 and opens the limit switch 57, causing the forward contactor 50 to open whereby the motor 45 is stopped.

The timing relay 55, which preferably will be of the type described in the United States patent granted to H. M. Stephenson, No. 1,699,125 and dated January, 15, 1929, is set in operation simultaneously with the closing of the button 53. Thus, when the button 53 is closed, the electromagnets 65 and 66 are energized. The energization of the electromagnet 65 causes the armature 67 associated therewith to be attracted and the worm 68 to be brought into engagement with worm wheel 69. The switch contacts 70 of the relay 55 are mechanically held in their closed position by means of the latch 71, despite the tendency of the resilient hooked switch arm 72 associated with the armature 67 to open these contacts when the electromagnet 65 is energized. The electromagnet 66 and the disk 73 of non-magnetic electrically conducting material are intended to indicate diagrammatically an alternating current disk type motor. As the disk 73 rotates, the worm wheel 69 will be caused to rotate by means of the worm 68 so that eventually the pin 74 will engage the pivoted catch 71 and move the catch out of engagement with the lower end of the switch lever carrying one of the contacts 70. When the catch 71 is released, the resilient switch member 72 opens the contacts 70 and closes the contacts 75. When the contacts 70 are opened the electromagnet 66 is deenergized so that the worm wheel 69 will not be further rotated. When the contacts 75 are closed, a circuit is completed from the push button 53 which is still in closed positon, through the contacts 75 and the operating coil 56a of the control relay 56, thereby causing the relay to close and again establishing the circuit through the operating coil of the forward contactor 50. Thus the motor 45 which has been deenergized by the opening of the limit switch 57, is again energized and the brake band 14 given additional tension for locking the armature 11 securely in place. The motor 45 operates to tighten the brake until deenergized by the opening of the time interlock 60 of the control relay 56, which time is governed by the setting of a dashpot 76 connected with the interlock.

When it is desired to release the brake, the release button 54 is pressed which closes a circuit through the operating coil 51a of the reverse contactor 51. The contactor 51 thereupon closes and starts the motor in the opposite direction which will cause the trunnion block 42 to travel upward on the shaft 41 and release the brake. When the brake has been fully released the brake motor is stopped by the opening of the limit switch 77 mounted upon the standard 40 and tripped by a cam 78 on the trunnion block 42 which cam engages an operating member 79 for the limit switch.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States is:—

1. The combination with a brake, of lever mechanism operably connected to said brake, means associated with said lever mechanism for applying a predetermined force, means for actuating said lever mechanism whereby said force is exerted upon said brake and means dependent upon the braking force for controlling said actuating means.

2. The combination with a brake, of lever mechanism operably connected to said brake, a motor operably connected to said lever mechanism for applying said brake, and means responsive to the braking force for controlling said motor.

3. The combination with a brake, a lever mechanism operably connected to said brake, means adapted to exert a substantially constant predetermined force operably connected to said lever mechanism so that said force is transmitted by the operation of said lever mechanism to apply said brake with a substantially constant force, and means controlled by the movement of said lever mechanism for operating said mechanism to apply said force to said brake.

4. The combination with a brake, of a weight, a lever mechanism connected to said weight and to said brake arranged so that when said lever mechanism is operated the force of said weight is transmitted by said lever mechanism to apply said brake with a gradually increasing force until the braking force counter-balances that applied to said lever mechanism by said brake, actuating means for operating said lever mechanism and means dependent upon the braking force controlling said actuating means to stop the operation of said lever mechanism when the braking force has counter-balanced said weight.

5. The combination with a brake, of means adapted to exert a predetermined force, a lever mechanism operably connected to said means arranged to transmit the predetermined force to said brake, a motor for actuating said lever mechanism, and control means for said motor responsive to the predetermined force for causing said motor to cease to operate and timing means for thereafter causing said motor to operate to apply a force of increased magnitude.

6. The combination with a brake, of a weight, a compound lever mechanism operably connected to said weight and to said brake, a motor operably connected to said compound lever mechanism for imparting motion thereto whereby the constant force of said weight is transmitted to said brake whereupon said weight is lifted, and control means for said motor responsive to the movement of said weight.

7. The combination with a rotatable synchronous motor armature, of a brake therefor, a weight, lever mechanism operably connected to said weight and to said brake arranged to transmit the force of said weight to apply said brake during a portion of its movement, an actuating motor operably connected to said lever mechanism, means for initiating operation of said motor for causing application of said force, means operated by said lever mechanism for causing said motor to cease to operate after the application of said force, and a timing device for thereafter causing said motor to operate whereby a tensioning force of increased magnitude is applied.

8. The combination with a rotatable member, of a brake therefor, a lever operably connected at one end to said brake, a second lever pivoted to the other end of said first lever, means for applying a constant force to one end of said second lever, a motor operably connected to the other end of said second lever for moving said levers together to apply said brake until said force is overbalanced whereupon said second lever moves on its pivot with relation to the first, and means operated by said second lever for stopping said motor.

9. The combination with a brake, of a motor for operating said brake, control means for initiating the operation of said motor to apply said brake, means dependent upon the magnitude of the braking force for controlling said motor whereby upon the application of a predetermined braking force said motor ceases to operate to further increase the braking force and means including time element mechanism controlling the operation of said motor whereby upon the expiration of a predetermined interval of time after said control means has initiated the operation of said motor to apply said brake, said motor is again operated so as to apply an increased braking force.

10. The combination with a brake, a weight, lever mechanism operably connected to said brake arranged to transmit the force of said weight to apply said brake during a portion of its movement and upon continued movement to apply a braking force of increased magnitude, an actuating motor operably connected to said lever mechanism, means for initiating operation of said motor for causing the application of the force of said weight, means operated by said lever mechanism for stopping said motor after the application of said force and a timing device for thereafter starting said motor to apply said increased braking force.

11. The combination with a brake, of a motor for operating said brake and control means for said motor comprising means for initiating the operation of said motor to apply a braking force, means dependent upon said braking force controlling said motor to stop it upon the application of a predetermined braking force, means including time element mechanism dependent upon the operation of said first-mentioned means in initiating the operation of said motor to apply a braking force for restarting said motor a predetermined interval of time thereafter so as to apply a braking force of increased magnitude and means including time element mechanism dependent upon the operation of said first time element mechanism in restarting said motor for stopping said motor a predetermined interval of time thereafter.

In witness whereof, I have hereunto set my hand this 29th day of March, 1928.

ARTHUR H. LAUDER.